United States Patent Office 3,545,947
Patented Dec. 8, 1970

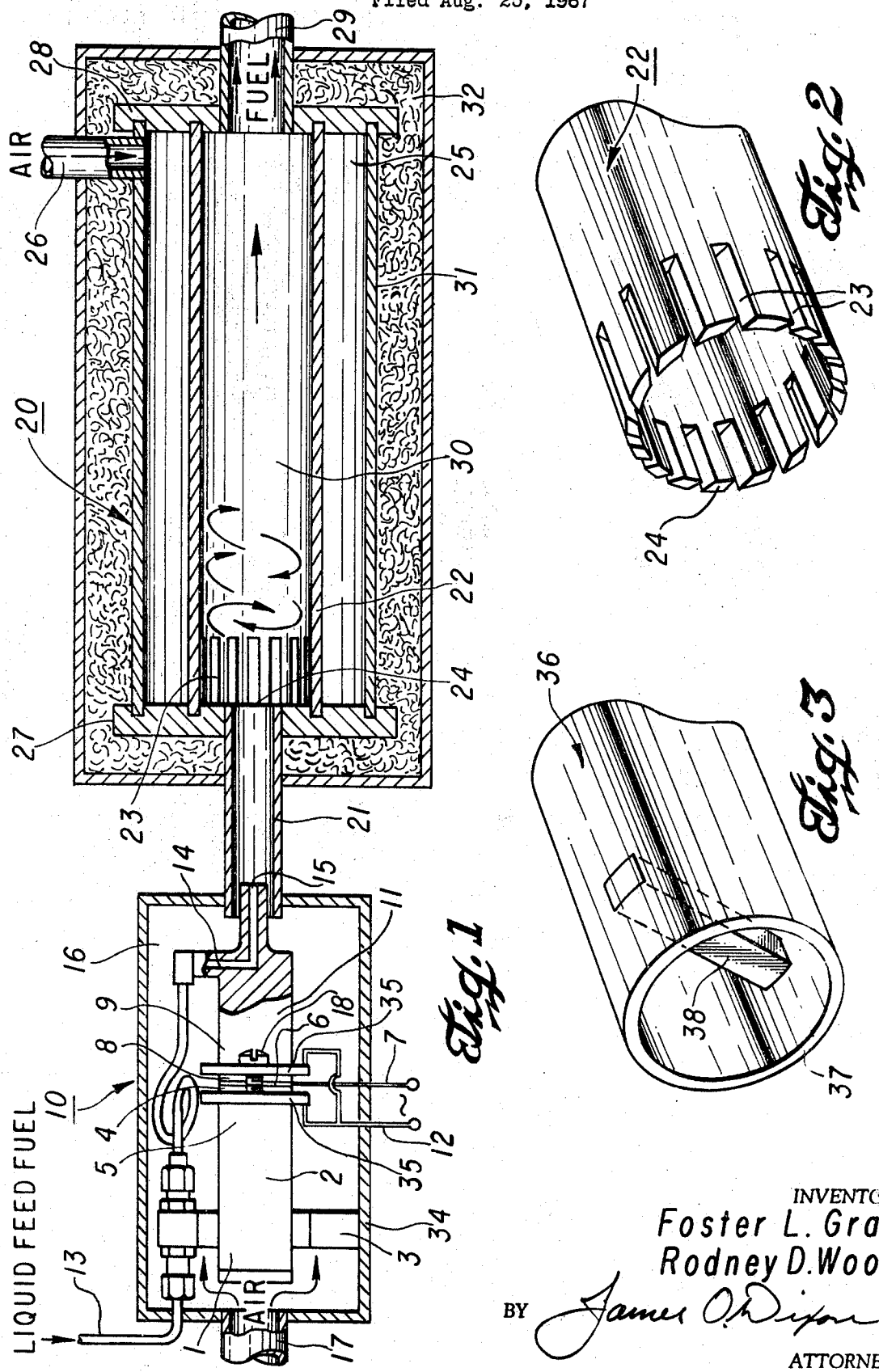

3,545,947
LIQUID FUEL-AIR PARTIAL OXIDATION SYSTEM
Foster L. Gray, Dallas, and Rodney D. Wood, Richardson, Tex., assignors to Texas Instruments Incorporated, Dallas, Tex., a corporation of Delaware
Filed Aug. 25, 1967, Ser. No. 663,283
Int. Cl. B01f 11/02; C01b 2/14; C10g 9/00
U.S. Cl. 48—107                                          3 Claims

ABSTRACT OF THE DISCLOSURE

Disclosed is an apparatus for partially oxidizing a liquid carbonaceous feed-fuel by first atomizing the liquid feed-fuel in an ultrasonic atomizer, mixing the atomized feed-fuel with air vaporizing the mixture, and then igniting the vaporized feed-fuel-air mixture in a reaction chamber to form a fuel containing free hydrogen.

---

This invention relates generally to the formation of hydrogen gas and more particularly to a partial oxidation system for producing a hydrogen containing fuel from a liquid carbonaceous feed-fuel or the like.

There are many needs in industry today for reducing atmospheres for such operations as the brazing of metals, decarburizing of steels and for fuel for certain types of fuel cells, for example. One type of fuel cell in use today is the molten carbonate fuel cell. As is well known in the art, a molten carbonate fuel cell generally comprises a cathode, an anode, and an electrolyte-matrix comprising a sodium-lithium-carbonate electrolyte held in a support medium, the matrix making mutual contact to both the anode and the cathode. When a fuel containing hydrogen is applied to and reacts on the anode side of the electrolyte, and an oxidant containing essentially oxygen and carbon dioxide is applied to and reacts on the cathode side of the electrolyte, the cell being heated to an appropriate temperature (for example, about 700° C.), a flow of electric current is produced when the anode and cathode are connected by an external circuit.

A molten carbonate type fuel cell can be devised that uses pure hydrogen on the anode or fuel electrode side of the cell. However, the preparation of pure hydrogen requires rather costly, large scale and complex equipment, which makes its use in a fuel cell impractical from the standpoint of the electrical output of the cell of competing with conventional electrical power. Various attempts have been made to use hydrocarbons or other carbonaceous fuels containing hydrogen in one form or another for use in such fuel cells. For example, attempts have been made to react methanol directly at the fuel electrode of a fuel cell. In another example, the hydrocarbon is cracked externally of the fuel cell and the product of the cracking is reacted at the fuel electrode of the cell. Catalytic reforming of the hydrocarbon to prepare fuel for a cell is also known in the art. In general, the various kinds of fuel cell systems (fuel cell and fuel producing apparatus) have had serious shortcomings, such as very low efficiency and susceptibility to operational deterioration, usually by catalytic poisoning. Moreover, elaborate and relatively large equipment is usually required to produce relatively small quantities of electric power.

To overcome the above-mentioned difficulties, reactor systems involving the partial oxidation reaction of hydrocarbon feed-fuels have been used. However, in most of these systems the feed-fuel has to be heated to a sufficient temperature to raise its vapor pressure to the desired level. The high temperature necessary for this vaporization causes solid varnish-like deposits to form in the chambers used to vaporize the liquid carbonaceous feed-fuel prior to the partial oxidation reaction, thereby rendering the system inoperative.

Accordingly, an object of this invention is an improved partial oxidation reactor system for producing hydrogen-rich fuel from liquid carbonaceous feed-fuel that does not produce solid deposits in the chamber used to prepare the liquid feed-fuel for ignition.

Another object of the invention is an improved partial oxidation reactor system with improved flame stabilization for producing hydrogen-rich fuel from a liquid carbonaceous feed-fuel.

A further object of the invention is an improved partial oxidation reactor system having improved feed-fuel and air mixing properties for producing hydrogen rich fuel from a liquid carbonaceous feed-fuel.

A still further object of the invention is an improved flame stabilized reactor.

The novel features believed to be characteristic of this invention are set forth with particularity in the appended claims. The invention itself, however, as well as further objects and advantages thereof may best be understood by reference to the following detailed description when read in conjunction with the accompanying drawing, wherein:

FIG. 1 is a pictorial view, partially in section, illustrating the partial oxidation reactor system of the invention, including the ultrasonic atomizer and the swirl stabilized reactor.

FIG. 2 is an isometric projection, illustrating the swirl-stabilized reactor chamber showing, in particular, the tangentially located air openings.

FIG. 3 is an isometric projection, illustrating a bluff body stabilized reactor chamber.

Briefly, the invention is a swirl-stabilized reactor and the combination of the swirl-stabilized reactor or any other type of flame-stabilized reactor in combination with an ultrasonic atomizer. A liquid carbonaceous feed-fuel is atomized by the ultrasonic atomizer into small individual droplets and injected into a heated reaction chamber. In the swirl-stabilized reactor chamber air is introduced into the chamber through precisely located and patterned openings therein. The openings impart a swirling motion to the air as it mixes and reacts with the atomized feed-fuel. The swirling motion stabilizes the flame produced by the partial oxidation reaction of the feed-fuel and air with the reaction products containing free hydrogen exiting the chamber at the end opposite the reaction zone.

Referring now to the drawing, there is illustrated in FIG. 1 the partial oxidation reactor system constructed in accordance with the present invention. It includes an ultrasonic atomizer that is generally referred to by the numeral 10, and a swirl-stabilized reactor which is generally referred to by the numeral 20, the combination of which forms the partial oxidation system of the invention. It is to be noted that FIG. 1 is not drawn to scale in order to better illustrate the salient features of the invention.

The ultrasonic atomizer 10 has a pair of mechanically resonant horns 2 and 11 which are connected by a pair of piezoelectric transducer crystals 4 and 8 and held together by a number of screws 18 through flanges 35. The resonant horn assembly (horns 2 and 11 and crystals 4 and 8) is mechanically attached to but electrically insulated from a support member 3 at the end 1 of the horn 2. One face of the crystal 4 is bonded to the opposite end 5 of the horn 2 while the opposite face of the crystal is bonded to an electrically conductive layer 6 which acts as the common electrode to the crystal 4 and the second crystal 8, the opposite face of crystal 8 being bonded to the end 9 of the horn 11. Electrical connection is made to the conductive layer 6 and both resonant horns 2 and 11 by the electrical wiring 7 and 12, respectively. The lengths of the horns 2 and 11 are determined by the wavelength of the alternating voltage applied to the crystals 4 and 8 by a source of A.C. voltage (not shown) connected to the wiring 7 and 12.

A liquid feed-fuel line 13, supported near one end by the support member 3 and connected at the other end to the port 14 in the horn 11, is connected to an external pressurized source of liquid feed-fuel (not shown). The feed-fuel line 13 has a bend or a flexible coupling, for example, which allows the tip 15 of the horn 11 to move longitudinally in relationship to the fixed end 1 of horn 2 without rupturing. The port 14 extends through the horn 11 to an opening in the tip 15, with the horn assembly being centrally located within the outer chamber 16 formed by an outer shell 34 so that the tip 15 is also centrally located within one end of the connecting tube 21. The air chamber 16 of the ultrasonic atomizer 10 is connected to the swirl-stabilized reactor 20 by the connecting tube 21. At the opposite end of the ultrasonic atomizer 10 from the tip 15 is an air inlet 17 connected to the air chamber 16.

The swirl-stabilized reactor 20 has a centrally located reactor tube 22 which is positioned in line and connected at its entrance end 24 to the connecting tube 21. As shown particularly in FIG. 2, the reactor tube 22 has one or more openings 23 (a plurality of opening being shown) located around the circumference thereof adjacent the entrance end 24, which end is open, of course, to receive the atomized feed-fuel in the air stream from the connection tube 21, as later described. The openings 23 in the wall of the reactor tube 22 can be of any length depending upon the desired length of the reaction zone or vortex. The openings 23 are formed along the longitudinal direction of the reactor tube 22 and cut through the wall thereof tangentially to the circumference. Circling the reactor tube 22 is an outer tube 31 (shown in FIG. 1) which forms the chamber 25 therebetween. The outer tube 31 has an air inlet 26 at the end opposite the openings 23 in the reactor tube 22. Both the reactor tube 22 and the outer tube 31 are held in place by end members 27 and 28 which also complete the chamber 25 and partially close the ends of the reactor chamber 30 except for an entrance and an exit. The two tubes 22 and 31 and the two end members 27 and 28 are enclosed within insulation 32. An exhaust tube 29 connected to the reactor chamber 30 through the end member 28 conveys the products of the reaction, to be subsequently described, from the reaction chamber 30.

In operation, the resonant horns 2 and 11 are excited by applying a sinusoidal voltage to each of the piezoelectric crystals 4 and 8, which crystals, due to the applied voltage, expand and contract in relationship to the waveform of the voltage. This alternating expanding and contracting motion is imparted to the tip 15 of the horn 11 which atomizes the feed-fuel flowing through the tip 15 via the port 14 from the liquid feed-fuel line 13. Liquid feed-fuel, such as a hydrocarbon or other carbonaceous fuel containing hydrogen, is supplied to fuel line 13 from an external source (not shown). The liquid fuel is supplied under pressure, which may be accomplished by using compressed air or other suitable means.

The operation of the ultrasonic atomizer 10 is based on the principle that a liquid surface, when strongly vibrated, forms steep waves with liquid particles being ejected from the wave tips. As the frequency increases, the waves become finer resulting in smaller atomized droplets. The efficiency of the partial oxidation reaction to be explained later increases as the droplet size decreases. Conversely, however, as the droplets become smaller, the flow of atomized feed-fuel decreases. Thus, a compromise must be effected between the desire for a high rate of flow and the size of the droplets by a suitable selection of the frequency of the current applied to the crystals 4 and 8.

If the crystals were not cooled, the heat produced by the heat from the swirl-stabilized reactor 20 would destroy the crystals. Therefore, to keep the temperature of the atomizer 10 below about 140° F., air, at an ambient temperature, is introduced through the air inlet 17 and allowed to circulate around the horn and crystal assembly in the chamber 16 before the air enters the reactor 20 through the connecting tube 21. It should therefore be noted that the liquid feed-fuel introduced through the feed-fuel line 13 is not heated, as in conventional reactors, but is at a temperature slightly above ambient temperature.

The ultrasonic atomizer 10 is capable of atomizing over a wide range of fluid density, viscosity, and flow rates down to a flow rate as low as 0.1 lb. per hour of feed-fuel. The horn and crystal assembly was developed by the Battelle Memorial Institute, Cleveland, Ohio.

The atomized feed-fuel leaves the tip 15 and is conveyed by the air from the chamber 16 through the connecting tube 21 into the swirl-stabilized reactor 20. The tip 15 of the horn 11 is so located in a relationship to the connecting tube 21 that the atomized feed-fuel droplet-air stream strikes the surface of the connecting tube 21 at a point that is made hot enough by the conduction of heat from the swirl-stabilized reactor 20 to cause the feed-fuel droplets to boil when they near the hot surface of the connecting tube 21. The vapor produced by the boiling of the droplets forms a minimum amount of solid deposits on the wall of the connecting tube.

In the operation of the swirl-stabilized reactor 20, the mixed feed-fuel and air is ignited and the temperature inside the reactor chamber 30 is raised by the exothermic heat of the following reaction:

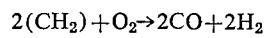

$$2(CH_2) + O_2 \rightarrow 2CO + 2H_2$$

The ($CH_2$) represents a hydrogen-bearing carbonaceous feed-fuel such as gasoline, for example, which is introduced into the chamber 30 in atomized form from the tip 15 of the resonating horn 11. The $O_2$ comes both from the air introduced along with the atomized feed-fuel through the connecting tube 21 and the larger quantity (about 90% of the total) introduced under pressure through the openings 23 in the reactor tube 22 from the air inlet tube 26. The temperature of the air in the outer chamber 25 is increased by the absorption of heat from the wall of the reactor tube 22 as the air passes down the length of said outer chamber, so that the heated air entering the reactor tube 22 through the openings 23 therein increases the temperature of the reaction, thereby increasing the efficiency of the reaction. The heating of the incoming air in the outer chamber 25 also assists in cooling the walls of the reactor tube 22 near the exhaust end and cools the reaction products passing through the outlet tube 29 to a lower temperature, thereby materially reducing the requirement for additional cooling prior to use of the exhausting fuel. The openings 23, being tangential to the circumference of the reactor tube 22, cause the air within it to swirl in a circular direction, creating a vortex in the portion of the chamber 30 adjacent the openings 23.

The vortex serves two very important functions. The atomized feed-fuel mixes with the air in the vortex to a degree not obtainable by mixing the feed-fuel and air as both travel down a tube. Another function of the vortex is to stabilize the flame within the chamber 30 caused by the partial oxidation reaction (known as swirl-stabilization) much more efficiently than other methods commonly used such as the bluff body stabilized reaction chamber shown in FIG. 3. Therefore, the flame resulting from the partial oxidation reaction stays within the vortex area and does not travel either up or down the reaction chamber as the reaction continues.

Water in the form of steam can be introduced with the air from inlet 26 or added at the outlet tube 29, if desired.

Water introduced with the air from inlet 26 will cause a reaction known as "steam reforming" according to the following equation:

$$C_xH_y + H_2O \rightarrow xCO + \left(\frac{y}{2}+1\right)H_2$$

or cause the reaction known as "shift reaction" according to the following equation:

$$CO + H_2O \rightarrow CO_2 + H_2$$

The introduction of water at the outlet tube 29 after the reaction with the feed-fuel has occurred causes a part of the carbon monoxide present to undergo the shift reaction and to decrease the disproportion of carbon monoxide (discouraging the $2CO \rightarrow C + CO_2$ reaction which forms carbon).

The swirl-stabilized reactor tube 22 of the invention is shown in FIG. 2. The air openings 23 are cut tangentially to the tube circumference at the end 24 of the tube 22. As was previously explained, the air entering the tube 22 in a circumferential direction through the openings 23 mixes with the feed-fuel entering the end 24 of the tube in a down-tube direction. The swirling air and feed-fuel forms a vortex which stabilizes the flame in the vortex region, thus preventing the flame from progressing either up or down the reaction chamber 22.

A commonly used type of flame-stabilized reactor tube 36 using the bluff-body technique is shown in FIG. 3. An obstruction to the flow of feed-fuel and air, both entering the end 37, is provided by a bluff-body in the form of a rod 38, for example, which is inserted through the wall of the tube 36. The velocity and direction of the feed-fuel and air mixture changes as the mixture travels around the rod 38, the change of direction and velocity causing a turbulence which stabilizes the flame in the region adjacent the rear or down-tube side of the rod 38.

The following examples are offered by way of further explanation and clarification. They are merely illustrative of how the invention may be practiced and are not intended to be taken as limiting in scope.

EXAMPLE I

Gasoline—1.25 lbs./hr.
Air—7.40 lbs./hr.
Water—none
Reaction zone temperature—1225° C.
Reaction products, percent by volume:
  $H_2$—19.76
  $H_2$—54.54
  $CH_4$—0.46
  CO—18.97
  $CO_2$—3.76
  $H_2O$—2.51

EXAMPLE II

Gasoline—1.25 lbs./hr.
Air—5.92 lbs./hr.
Water—0.40 lbs./hr.
Reaction zone temperature—1225° C.
Reaction products, percent by volume:
  $H_2$—26.09
  $N_2$—46.84
  $CH_4$—0.74
  CO—20.09
  $CO_2$—3.73
  $H_2O$—2.51

Various modifications of the invention will become apparent to persons skilled in the art without departing from the spirit and scope of the invention as defined by the appended claims.

We claim:
1. A partial oxidation system for producing gaseous fuel containing free hydrogen from liquid carbonaceous feed-fuel which includes:
   an ultrasonic atomizer having an inlet and an outlet for receiving the liquid carbonaceous feed-fuel through the inlet and discharging the same in small droplet form through the outlet;
   means for admixing air with the droplets of carbonaceous fuel discharged through said outlet;
   means for vaporizing the droplets discharged from said ultrasonic atomizer;
   a reactor having a combustion zone; and
   means for admixing said vaporized carbonaceous feed-fuel with air to produce a swirling mixture and introducing said swirling mixture into the combustion zone of said reactor.
2. The system of claim 1, wherein said means for vaporizing the droplets of carbonaceous feed-fuel discharged from said atomizer comprises:
   a heat conducting conduit which has one end in fluid communication with the outlet of said atomizer and the other end in fluid communication with said reactor, the end in communication with said reactor being positioned proximate to said combustion zone so that heat from said combustion zone is transmitted into said conduit for vaporizing droplets of a carbonaceous fuel flowing therethrough.
3. An oxidation system for producing gaseous fuel containing free hydrogen from liquid carbonaceous feed-fuel comprising:
   an ultrasonic atomizer having an inlet and an outlet for receiving a liquid carbonaceous feed-fuel through the inlet and discharging the same in small droplet form through the outlet;
   a conduit having one end in proximity to the outlet of said ultrasonic atomizer and so positioned to receive the discharged feed-fuel therefrom;
   means for introducing air into the first end of said conduit to entrain the droplets of carbonaceous feed-fuel in said air stream;
   means for heating said conduit to vaporize the carbonaceous feed-fuel therein;
   a combustion chamber communicating with the second end of said conduit;
   means for introducing air into the combustion chamber at a point upstream from the point where said carbonaceous fuel and air are to combust to create a swirling motion in the air and fuel charged into the combustion chamber from the second end of said conduit.

References Cited

UNITED STATES PATENTS

| | | | |
|---|---|---|---|
| 1,939,302 | 12/1933 | Heaney | 261—1 |
| 2,398,654 | 4/1946 | Lubbock et al. | 48—107X |
| 2,414,329 | 1/1947 | Reichhelm | 48—107 |
| 3,016,233 | 1/1962 | Olmstead | 261—1X |
| 3,030,773 | 4/1962 | Johnson | 431—352X |

JOSEPH SCOVRONEK, Primary Examiner

U.S. Cl. X.R.

23—277; 261—1; 431—351